(12) United States Patent
Tallagnon

(10) Patent No.: US 10,458,065 B2
(45) Date of Patent: Oct. 29, 2019

(54) SYSTEM OF ENTANGLEMENT AVOIDANCE

(71) Applicant: Thomas Collins Tallagnon, Worcester, MA (US)

(72) Inventor: Thomas Collins Tallagnon, Worcester, MA (US)

(73) Assignee: Thomas Collins Tallagnon, Worcester, MA (US)

( * ) Notice: Subject to any disclaimer, the term of this patent is extended or adjusted under 35 U.S.C. 154(b) by 112 days.

(21) Appl. No.: 15/456,296

(22) Filed: Mar. 10, 2017

(65) Prior Publication Data

US 2017/0261067 A1    Sep. 14, 2017

Related U.S. Application Data

(60) Provisional application No. 62/306,410, filed on Mar. 10, 2016.

(51) Int. Cl.
| | | |
|---|---|---|
| *F16G 11/10* | (2006.01) | |
| *D07B 9/00* | (2006.01) | |
| *F16G 11/06* | (2006.01) | |
| *B66C 1/34* | (2006.01) | |

(52) U.S. Cl.
CPC ............... *D07B 9/00* (2013.01); *F16G 11/06* (2013.01); *F16G 11/10* (2013.01); *B66C 1/34* (2013.01)

(58) Field of Classification Search
CPC ..... D07B 9/00; F16G 11/046; Y10T 24/3969; Y10T 24/3958; Y10T 24/3973; Y10T 403/4345

See application file for complete search history.

(56) References Cited

U.S. PATENT DOCUMENTS

| | | | | |
|---|---|---|---|---|
| 2,174,192 | A * | 9/1939 | Meighan | F16G 11/00 24/129 R |
| 5,339,498 | A * | 8/1994 | Parsons | B63B 21/08 24/115 M |
| 5,553,360 | A * | 9/1996 | Lucas | F16G 11/046 24/136 K |
| 9,157,505 | B2 * | 10/2015 | Seader | F16G 11/10 |
| 2012/0137475 | A1 * | 6/2012 | Seader | F16G 11/10 24/129 R |
| 2014/0101898 | A1 * | 4/2014 | Chu | A44B 11/06 24/115 A |
| 2014/0237774 | A1 * | 8/2014 | Kline | F16G 11/046 24/129 R |
| 2015/0089776 | A1 * | 4/2015 | Meillan | A45F 3/22 24/318 |

* cited by examiner

*Primary Examiner* — Robert Sandy
*Assistant Examiner* — Rowland Do

(57) ABSTRACT

A wire rope entanglement avoidance device includes a guide component including a top portion and bottom portion, the top portion and bottom portion shaped along a curvature, the top portion and bottom portion arranged in rotational opposition along a length of material and adapted to fit around the wire rope and a sheath, disposed at an offset from the guide component, adapted to fit over a dead end of the wire rope.

2 Claims, 9 Drawing Sheets

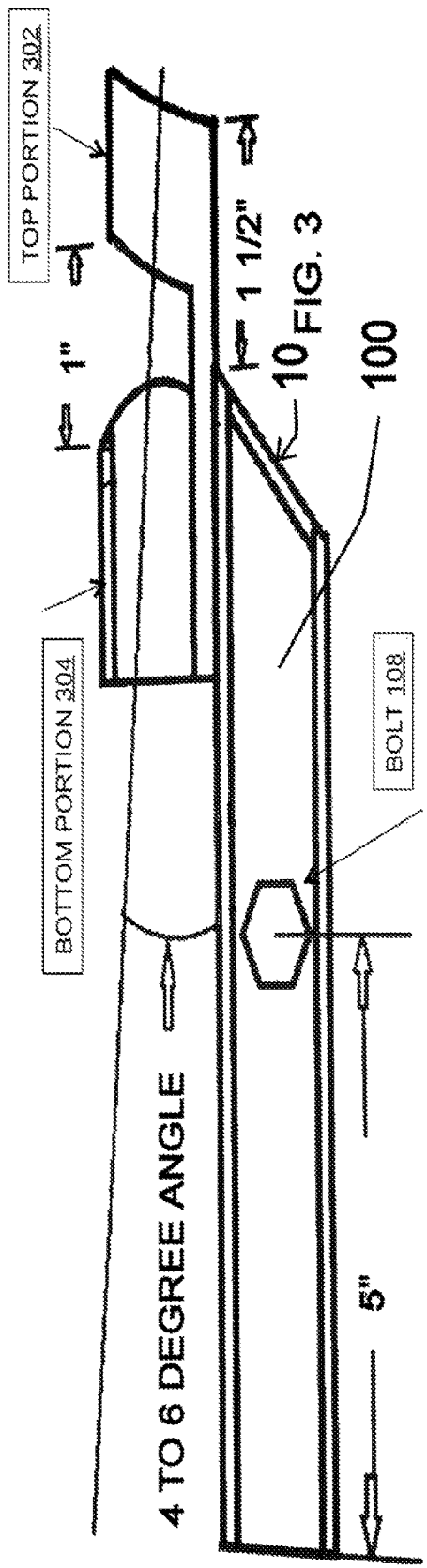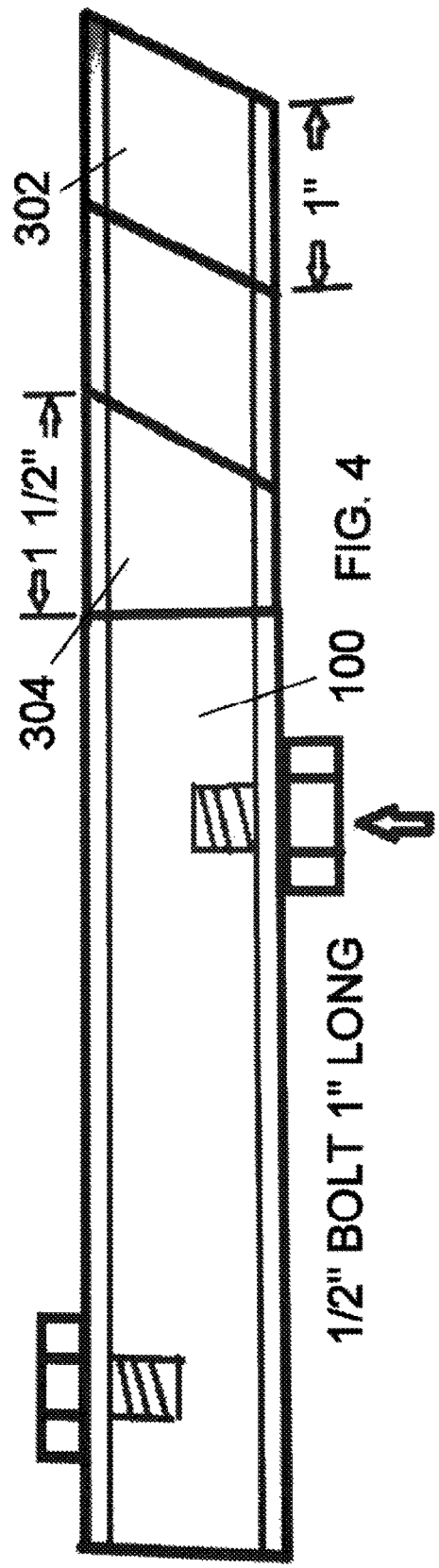

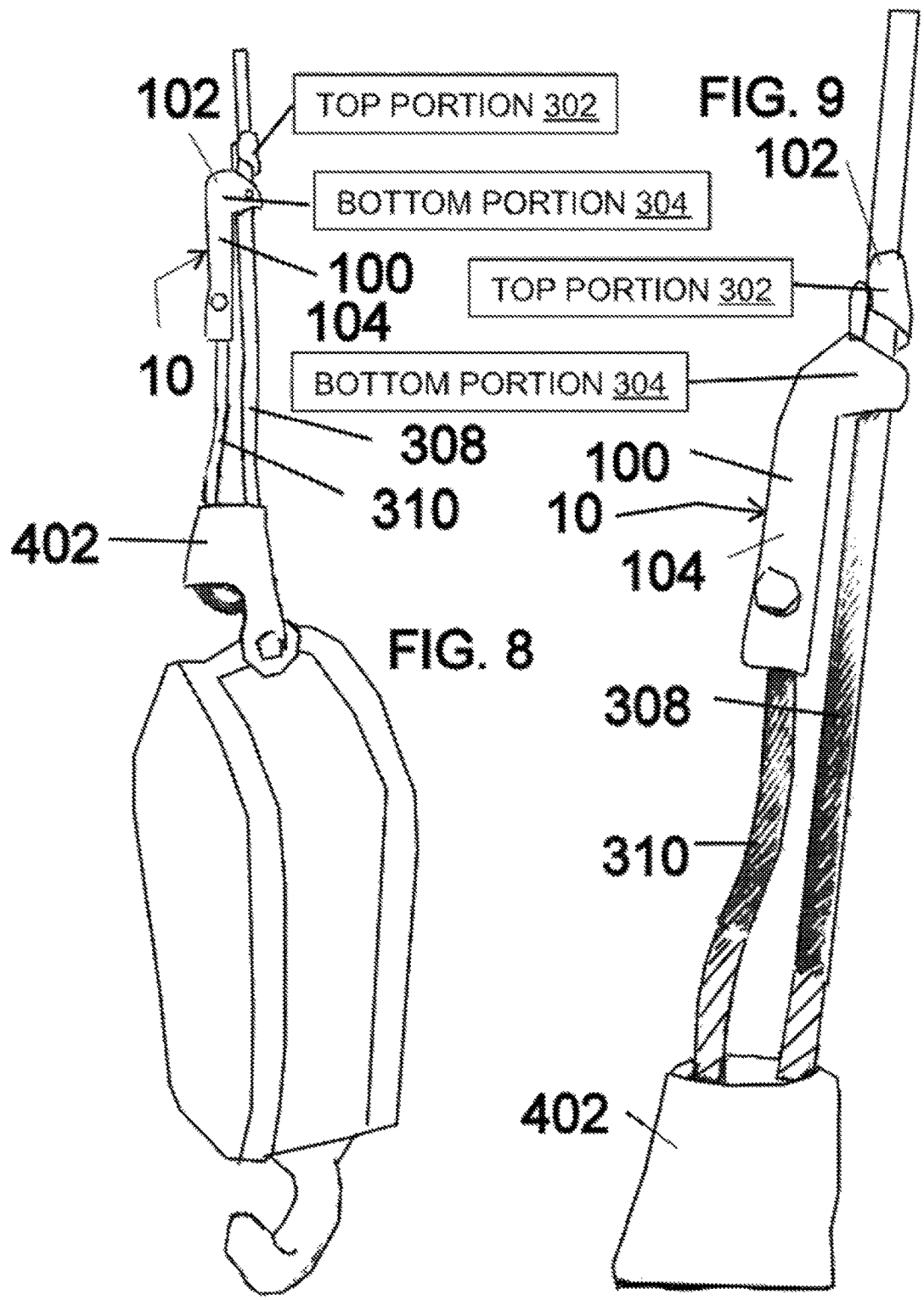

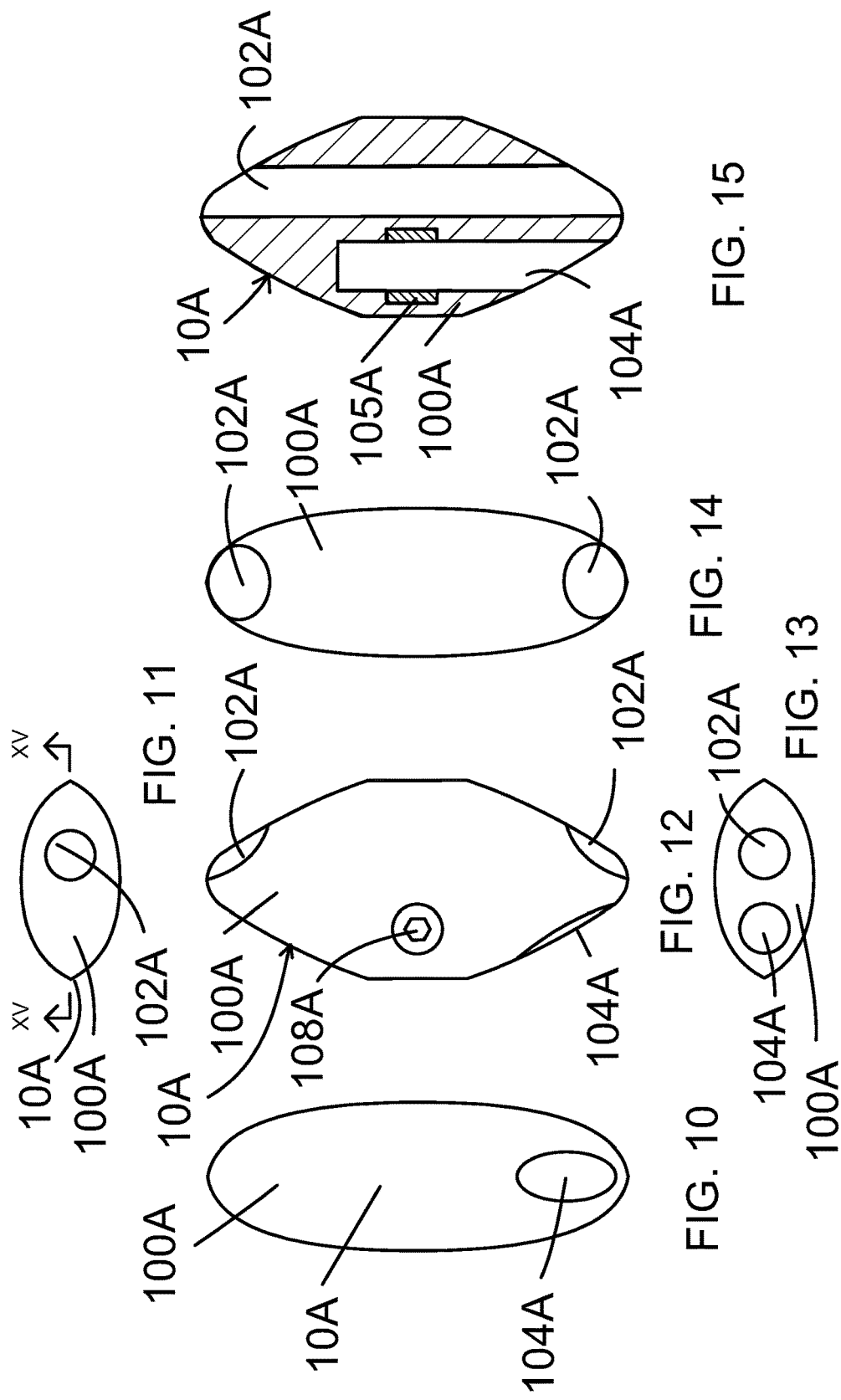

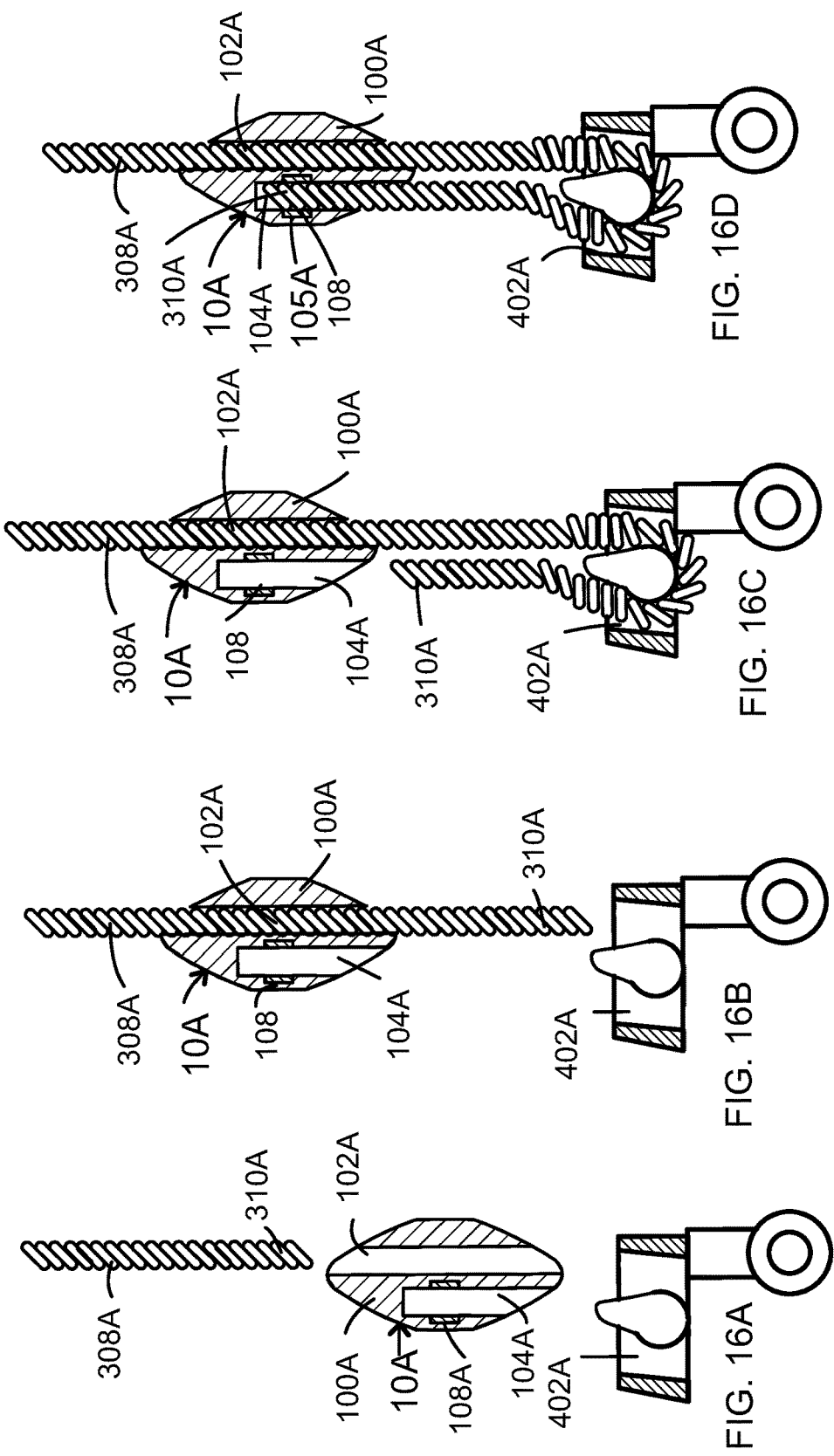

SYSTEM OF ENTANGLEMENT AVOIDANCE

CROSS-REFERENCE TO RELATED APPLICATIONS

This application claims the benefit under 35 U.S.C. § 119(e) of U.S. Provisional Application No. 62/306,410 filed Mar. 10, 2016, which is hereby incorporated by reference.

STATEMENT REGARDING FEDERALLY SPONSORED RESEARCH OR DEVELOPMENT

This invention has been created without the sponsorship or funding of any federally sponsored research or development program.

FIELD OF THE INVENTION

This disclosure relates to a device for terminating wire rope.

BACKGROUND OF THE INVENTION

Wedge socket assemblies have been used to terminate wire ropes on mobile cranes, however, their use is not without drawbacks. For example, even after the wedge and socket are properly installed and seated, the dead end may protrude from the socket, and in certain applications, become entangled during operation of the crane such as with tree branches or other component of the crane.

There remains a need for securing the dead end of a terminated wire rope on a crane to avoid entanglement and provide high visibility, such as visibility through trees.

BRIEF SUMMARY OF THE INVENTION

In an aspect, a wire rope entanglement avoidance device may include a guide component including a top portion and bottom portion, the top portion and bottom portion shaped along a curvature, the top portion and bottom portion arranged in rotational opposition along a length of material and adapted to fit around the wire rope and a sheath, disposed at an offset from the guide component, adapted to fit over a dead end of the wire rope. This may further include one or more bolts to secure the device to the wire rope. In essence, the wire rope entanglement avoidance device creates a smooth non-concave surface from a point beyond the far edge of the dead end of the wire rope to a point on the live end of the wire rope and above the end of the dead end. This surface prevents anything from getting between or getting caught between the dead end and the free end of the wire rope.

These and other systems, methods, objects, features, and advantages of the present invention will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE DRAWINGS

The invention and the following detailed description of certain embodiments thereof may be understood by reference to the following figures:

FIG. 3 depicts a left view of an embodiment of the sheath terminator.

FIG. 4 depicts a front view of an embodiment of the sheath terminator.

FIG. 8 depicts the sheath terminator in place over the dead end of a wire rope.

FIG. 9 depicts the sheath terminator in place over the dead end of a wire rope.

FIG. 10 depicts a left side view of a second embodiment of the entanglement avoidance device.

FIG. 11 depicts a top view of the second embodiment the entanglement avoidance device.

FIG. 12 depicts a front view of the second embodiment the entanglement avoidance device.

FIG. 13 depicts a bottom view of the second embodiment of the entanglement avoidance device.

FIG. 14 depicts a right side view of the second embodiment of the entanglement avoidance device.

FIG. 15 depicts a sectional view, taken along line XV-XV of FIG. 11, of the second embodiment of the entanglement avoidance device.

FIG. 16A depicts the wire rope outside, but in line with, the second embodiment of the entanglement avoidance device and the terminator becket.

FIG. 16B depicts the wire rope passed through the guide component of the second embodiment of the entanglement avoidance device.

FIG. 16C depicts the wire rope passed through the guide component of the second embodiment of the entanglement avoidance device and then passed through the becket.

FIG. 16D depicts the wire rope passed through the guide component of the second embodiment of the entanglement avoidance device, then passed through the becket, and finally the wire rope dead end enclosed in the entanglement avoidance device sheath.

DETAILED DESCRIPTION OF THE INVENTION

Figure 1:
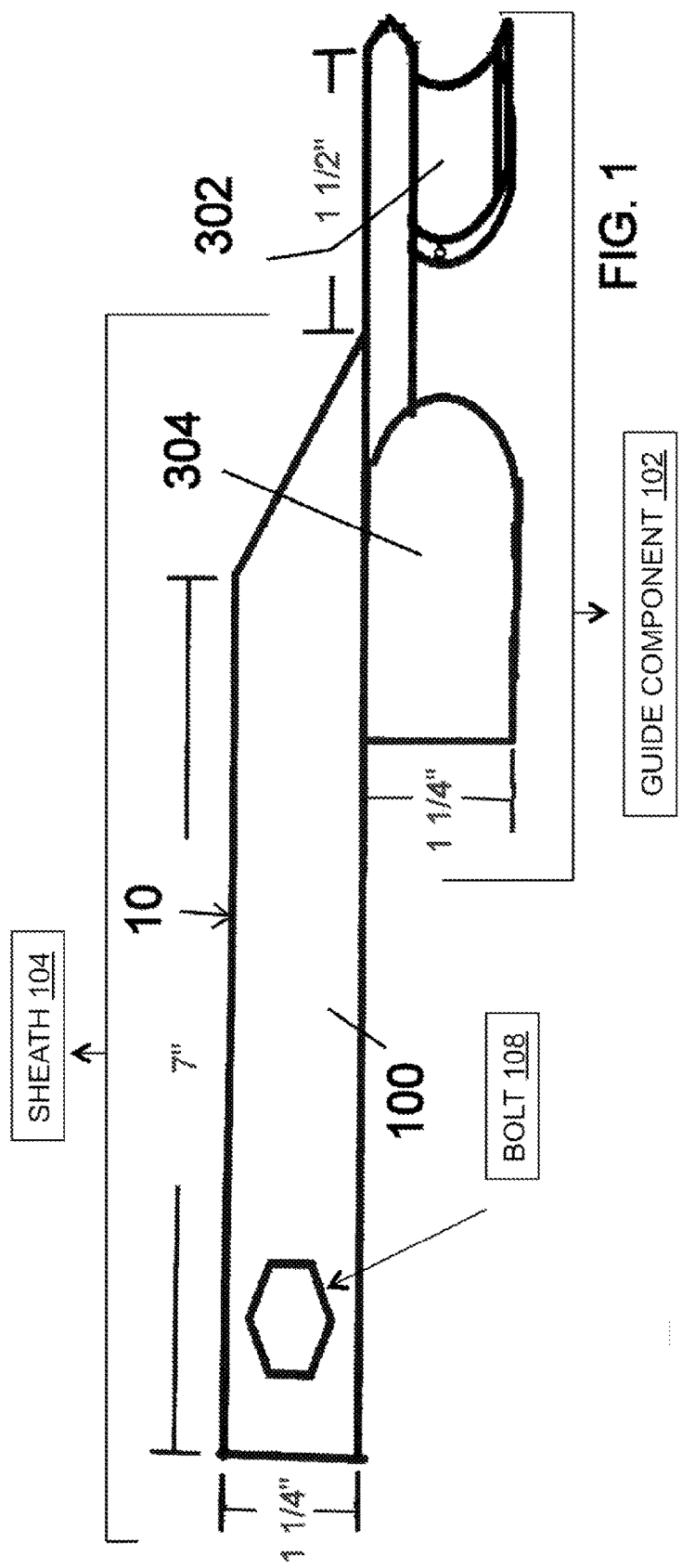
FIG. 1 depicts a side view of an embodiment of the sheath terminator.

Referring now to FIG. 1, a side view of an embodiment of the sheath terminator 100 is depicted. The guide component 102 is located in the uppermost portion of the terminator. In embodiments, the guide component 102 and sheath 104 are molded from a single piece of material, however, it should be understood that the portions 102, 104 may be welded together or otherwise assembled securely. The guide component 102 may include two pieces of curved material, the top portion 302, and the bottom portion 304, arranged in rotational opposition along a length of material and adapted to fit around a rope, such as a wire rope. The device creates a smooth non-concave surface 10 from a point beyond a far edge of the dead end of the wire rope to a point on the live end of the wire rope and above the end of the dead end, said surface preventing anything from getting between or getting caught between the dead end and the free end of the wire rope. In an example, the width of the guide component may be 1¼ inches in length. In an example, the length of the portion of the guide component 102 situated above the sheath portion 104 may be about 1½ inches in length. The sheath 104 may be 7 inches long in its shortest dimension and of 1¼ inches diameter. One or more bolts 108, such ½ inch bolts, may be used to secure the position of the terminator once it has been placed on a wire rope.

In an embodiment, the sheath 104 may be cylindrically shaped or alternatively, may be square, triangular or any other suitable shape.

Figure 2:
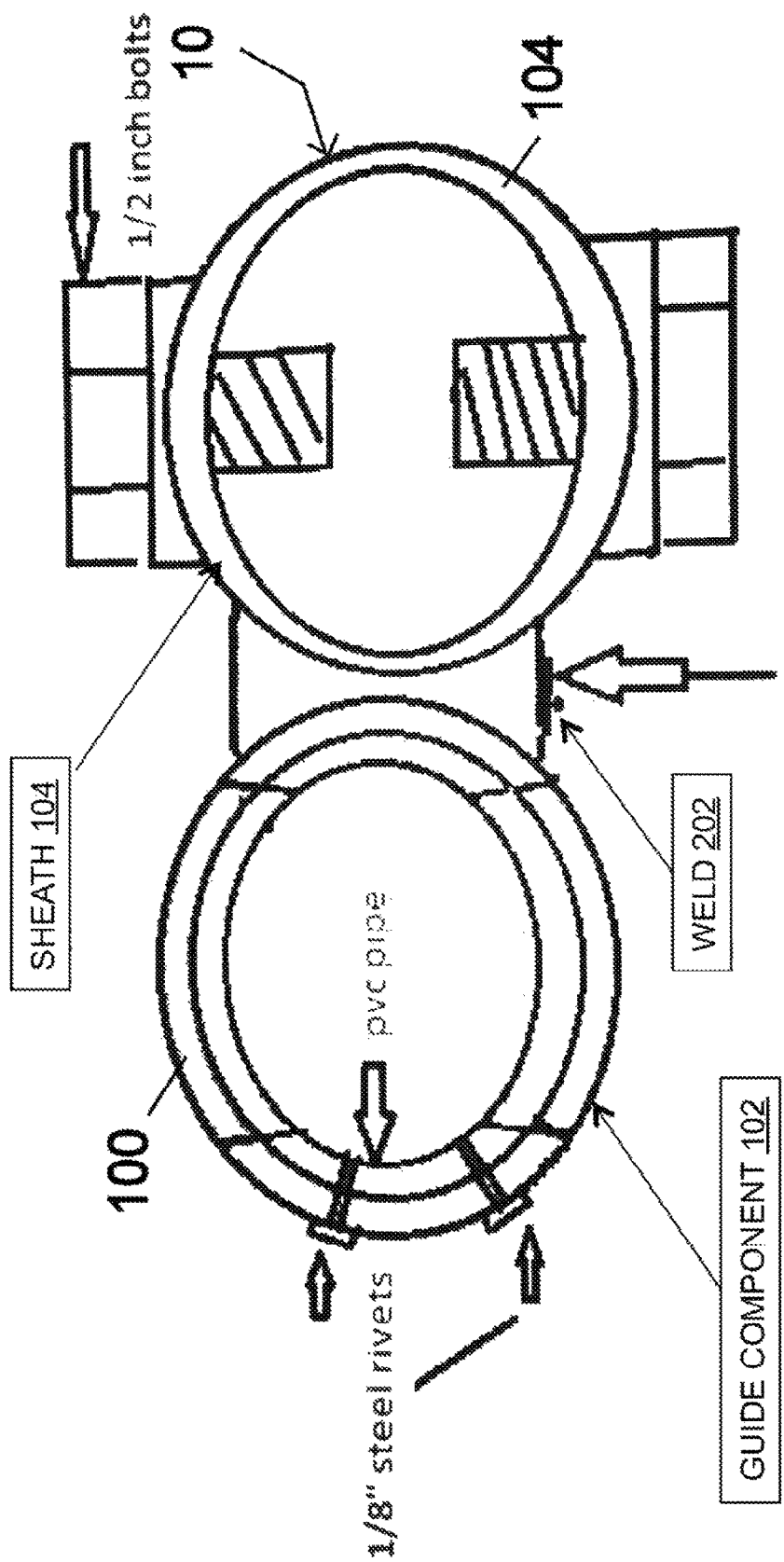
FIG. 2 depicts a top view of an embodiment of the sheath terminator.

In embodiments, the terminator 100 may be manufactured from steel pipe, such as steel pipe with ⅛ inch thickness, aluminum-steel alloys, or any other suitable material. In embodiments, the terminator may include various other materials molded on to the metal of the sheath and/or guide component. For example, a plastic material, such as polyvinyl chloride (PVC), polypropylene (PP), or polyethylene (PE), may be molded on to one or more portions of the terminator that contact the wire rope. The molding may be an overmolding on the entirety of the terminator portions or may just be placed on the inner surfaces of the curved portions of the guide component and/or an inner surface of the sheath 104. FIG. 2 depicts a top view of an embodiment of the sheath terminator 100 including PVC pipe molded on to portions of the guide component. Steel rivets may be used to secure the PVC to the metal of the guide component 102. The sheath 104 and guide component 102 may be joined together with a weld 202, such as a weld with steel wire.

FIG. 3 depicts a left view of an embodiment of the sheath terminator 100. In embodiments, the distance between the open edges of the two portions, the top portion 302 and the bottom portion 304, of the guide component may be about 1 inch. The two portions of the guide component may be disposed with respect to one another such that a line drawn between the center of the lower edge of the top portion and the center of the upper edge of the low portion is at an angle of 4 to 6 degrees from a line running down the length of the terminator. The distance between the center of the bolt 108, which may be about 1 inch long, to the bottom edge of the terminator may be about 5 inches.

FIG. 4 depicts a front view of an embodiment of the sheath terminator 100. The top portion of the guide component may be about 1 inch long.

Figure 5:
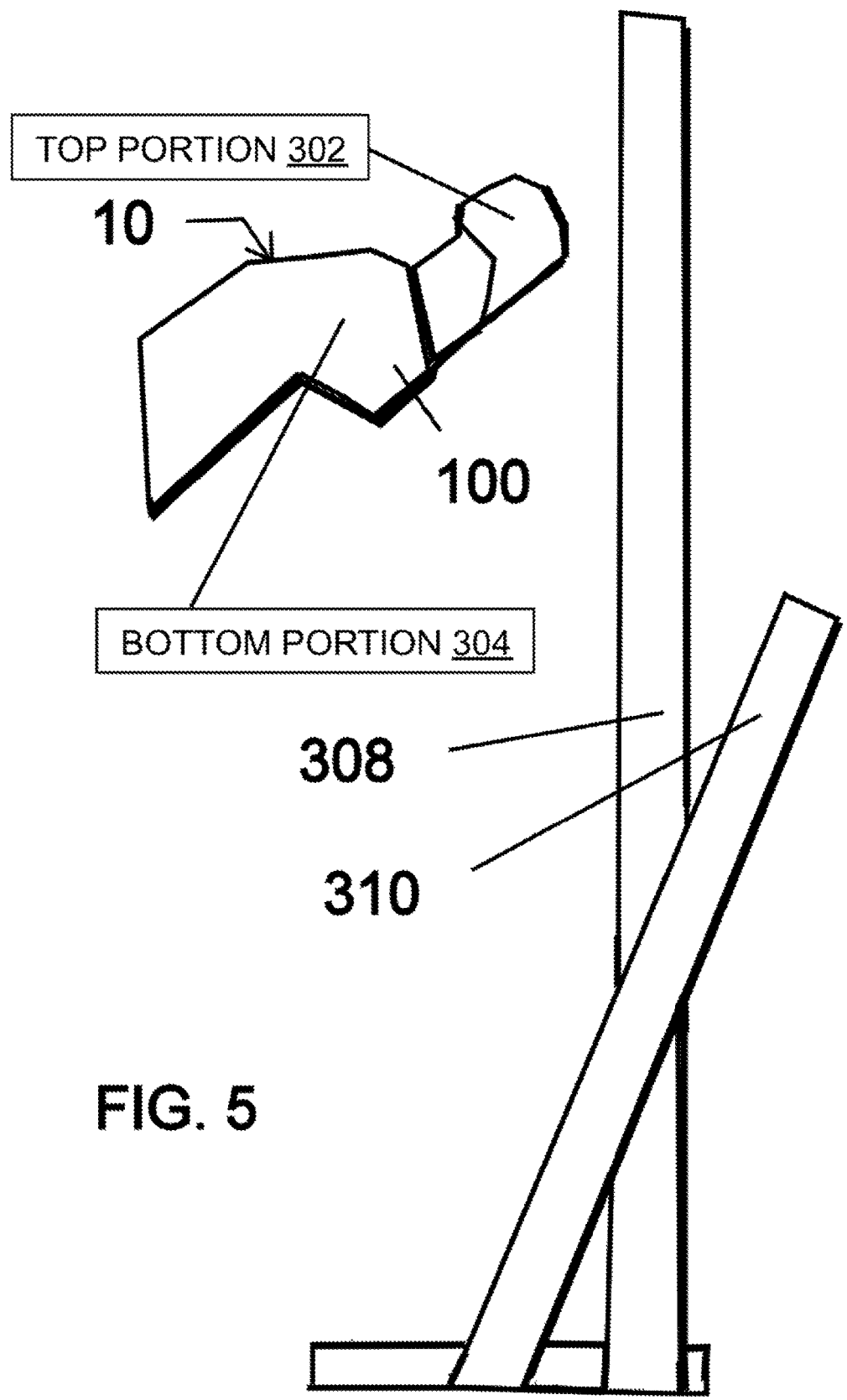
FIG. 5 depicts a view of the sheath terminator before attachment to the wire rope dead end.

FIG. 5 depicts a view of the sheath terminator 100 before attachment to the wire rope 308. The sheath terminator 100 is being tilted towards the wire rope 308 in preparation for engaging the top portion 302 and bottom portion 304 of the guide component. The sheath 104 is offset from the guide component so that it can fit over the adjacent portion of wire rope forming the dead end 310.

Figure 6:
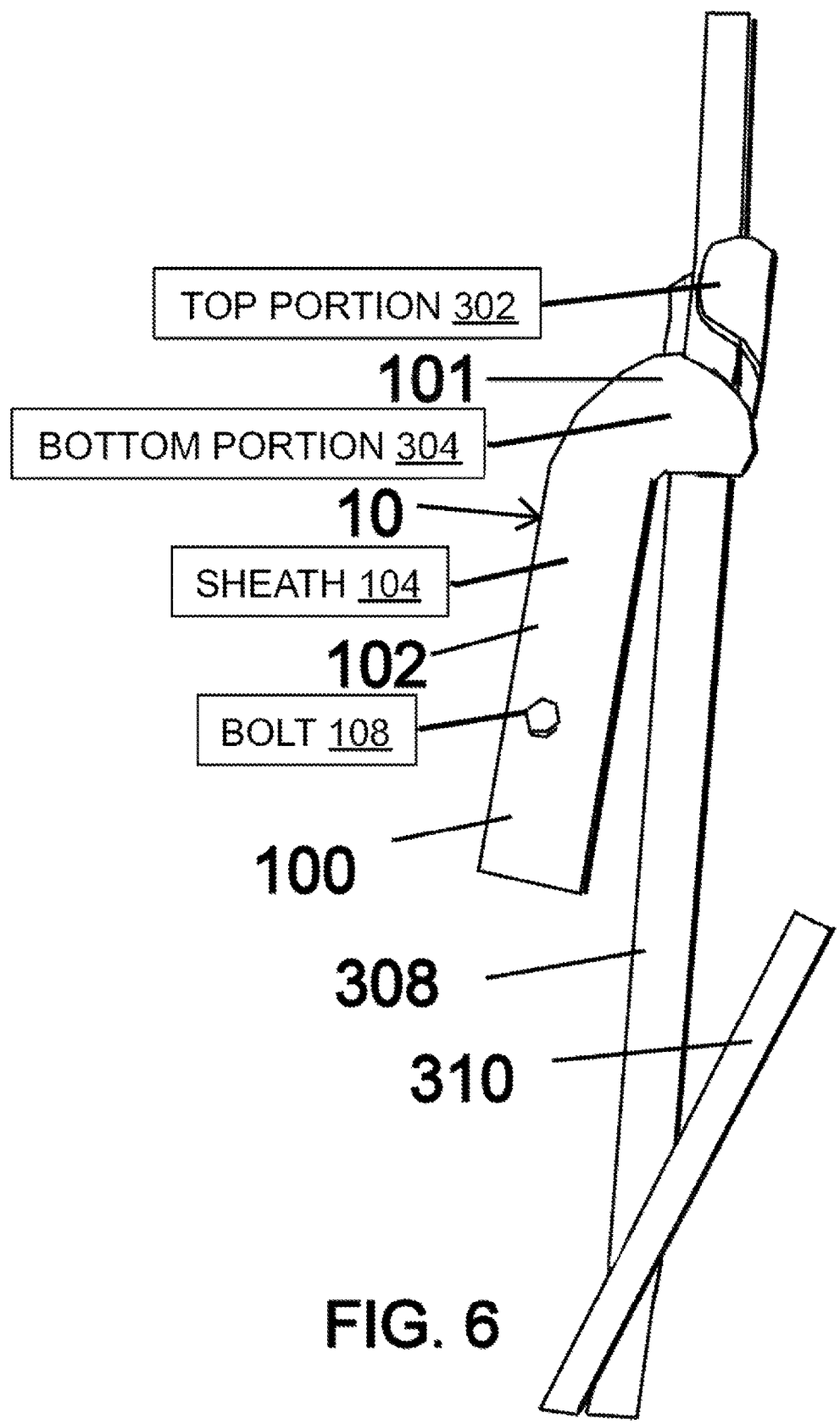
FIG. 6 depicts a view of the sheath terminator attached to the live end of the wire rope.

FIG. 6 depicts a view of the sheath terminator 100 attached to the live end of the wire rope 308. The top portion 302 and bottom portion 304 of the guide component have engaged the live end of the wire rope 308 in order to guide the sheath 104 into position over the dead end 310 of the rope 308. Once the sheath terminator 100 is in place, one or more bolts 108 may be tightened to secure the sheath terminator 100 to the dead end 310 of the rope 308.

Figure 7:
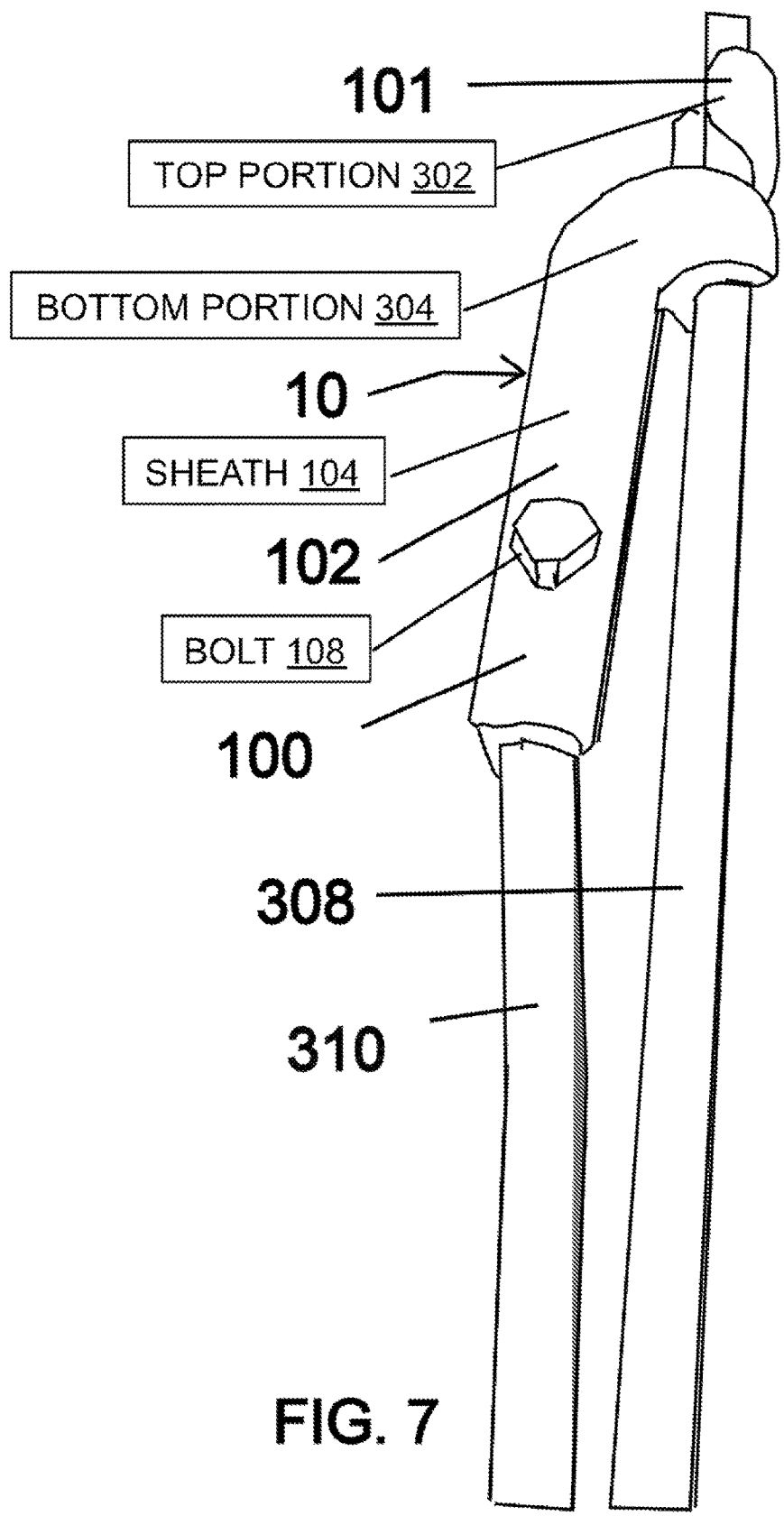
FIG. 7 depicts a view of the sheath terminator attached to the live end of the wire rope and being slipped over the dead end of the wire rope.

Referring now to FIG. 7, the sheath terminator 100 has been attached to the live end of the wire rope 308 via the guide component 102 and the sheath 104 is being slipped over the dead end 310 of the wire rope 308.

FIG. 8 depicts the sheath terminator 100 in place with the guide component 102 engaging the live end of the rope 308 and the sheath in place over the dead end 310 of the wire rope 308. FIG. 8 depicts the sheath terminator 100 in addition to other components 402 of the crane, which may include one or more of a Crosby™ clamp, a Crosby™ terminator wedge socket (402), terminator becket, crane blocks, reeve crane blocks, handling blocks, crane hooks, and the like.

FIG. 9 depicts the sheath terminator 100 in place with the guide component 102 engaging the live end of the rope 308 and the sheath 104 in place over the dead end 310 of the wire rope 308. FIG. 9 depicts the sheath terminator 100 in addition to other components 402 of the crane, including one or more of a Crosby™ clamp, a Crosby™ terminator wedge socket (402), terminator becket, crane blocks, reeve crane blocks, handling blocks, crane hooks, and the like.

FIG. 10 depicts a left side elavation view of a second embodiment of the entanglement avoidance device 100A shown in FIG. 12. FIG. 10 shows the blind bore 104A.

FIG. 11 depicts a plan view of a second embodiment of the entanglement avoidance device 100A shown in FIG. 12. FIG. 11 shows the through bore 102A.

FIG. 12 depicts a front elevation view of a second embodiment of the entanglement avoidance device 100A shown in FIG. 12. FIG. 12 shows the blind bore 104A, the through bore 102A, and the bolt 108A.

FIG. 13 depicts a right side elevation view of a second embodiment of the entanglement avoidance device 100A shown in FIG. 12. FIG. 13 the through bore 102A.

FIG. 14 depicts a bottom view of a second embodiment of the entanglement avoidance device 100A shown in FIG. 12. FIG. 14 shows the blind bore 104A, and the through bore 102A FIG. 15 depicts a sectional view, taken along line XV-XV of FIG. 11, of the second embodiment of the entanglement avoidance device shown in FIG. 12. FIG. 15 shows the blind bore 104A, the through bore 102A, and the band 105A surrounds the blind bore 104A, and that carries the bolt 108A.

FIG. 16A depicts the wire rope 308A outside, but in line with, an embodiment of the entanglement avoidance device 100A and the terminator becket 402A.

FIG. 16B depicts the wire rope 308A passed through the guide component, namely, the through bore 102A of an embodiment of the entanglement avoidance device 100A.

FIG. 16C depicts the wire rope 308A passed through the guide component, namely, the through bore 102A of an embodiment of the entanglement avoidance device 100A and then passed through and locked in the terminator 402A. The dead end 310A extends upward FIG. 16D depicts the wire rope 308A passed through the guide component, namely, the through bore 102A of an embodiment of the entanglement avoidance device 100A and then passed through and locked in the terminator 402A. The dead end 310A extends upward. The entanglement avoidance device 100A is lowered so that the dead end 310A is passed into the blind bore 104A and locked in the blind bore 104A, by the cooperation of the peripheral band 105A with the bolt 108A (not shown). The device creates a smooth non-concave surface 10A from a point beyond a far edge of the dead end of the wire rope to a point on the live end of the wire rope and above the end of the dead end, said surface preventing anything from getting between or getting caught between the dead end and the free end of the wire rope.

In embodiments, the sheath terminator 100A may be co-assembled with, co-molded with, or welded to the Crosby™ terminator wedge socket, terminator becket, or Crosby™ clamp. In embodiments, wire rope for cranes may be sold with associated sheath terminators.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A method for preventing entanglements between a dead end and a live end of a wire rope, said method comprising the steps of:
   a.) providing a body, wherein the body comprises a first guide component that is configured at an offset from a second sheath portion of the body by a curved portion of the body;
   b.) placing the first guide component of the body on the live end of the wire rope,
   c.) threading the wire rope through a terminator wedge socket so that the dead end is aligned adjacent to the live end; and
   d.) inserting the dead end of the wire rope into the second sheath portion of the body so that the second sheath portion of the body covers an end of the dead end and secures the dead end adjacent to the live end by the offset.

2. A method as recited in claim 1, which produces a smooth non-concave surface from a point beyond a far edge of the dead end of the wire rope to a point on the live end of the wire rope and above the end of the dead end.

* * * * *